United States Patent
Fleischer et al.

(10) Patent No.: US 12,032,078 B2
(45) Date of Patent: Jul. 9, 2024

(54) SYSTEM AND METHOD FOR OPTIMIZING BITRATE OF A WIRELESS HOTSPOT DEVICE

(71) Applicant: MiWire ApS, Hellebæk (DK)

(72) Inventors: David Fleischer, Hellebæk (DK); Mikael Espersen, Slangerup (DK)

(73) Assignee: MIWIRE APS, Hellebaek (DK)

( * ) Notice: Subject to any disclaimer, the term of this patent is extended or adjusted under 35 U.S.C. 154(b) by 471 days.

(21) Appl. No.: 17/288,769

(22) PCT Filed: Oct. 30, 2019

(86) PCT No.: PCT/EP2019/079705
§ 371 (c)(1),
(2) Date: Apr. 26, 2021

(87) PCT Pub. No.: WO2020/089318
PCT Pub. Date: May 7, 2020

(65) Prior Publication Data
US 2021/0396831 A1    Dec. 23, 2021

(30) Foreign Application Priority Data
Oct. 30, 2018   (EP) .................................... 18203421

(51) Int. Cl.
*G01S 3/42* (2006.01)
*H04W 24/02* (2009.01)
*H04W 48/16* (2009.01)

(52) U.S. Cl.
CPC .............. *G01S 3/42* (2013.01); *H04W 24/02* (2013.01); *H04W 48/16* (2013.01)

(58) Field of Classification Search
CPC .......... G01S 3/42; H04W 24/02; H04W 48/16
(Continued)

(56) References Cited

U.S. PATENT DOCUMENTS

| | | | |
|---|---|---|---|
| 6,895,253 B1 * | 5/2005 | Carloni | H01Q 1/007 455/562.1 |
| 7,359,362 B2 | 4/2008 | King et al. | |

(Continued)

FOREIGN PATENT DOCUMENTS

| | | | |
|---|---|---|---|
| CN | 205644279 U | * | 10/2016 |
| GB | 2479856 A | | 11/2011 |

(Continued)

*Primary Examiner* — Harry K Liu
(74) *Attorney, Agent, or Firm* — DINSMORE & SHOHL LLP

(57) ABSTRACT

A wireless hotspot device is equipped with a directional antenna. A method optimizes a bitrate of the device in a mobile network with distributed cells, each cell covered by a fixed transceiver. The method includes: rotating the antenna substantially azimuthally at least 90 degrees, in steps of N degrees, wherein N is a fixed or variable number; scanning for available cells for each step of rotation; observing a signal to noise ratio for each available cell in each step; saving an optimized azimuthal direction for each available cell, the optimized direction corresponding to the highest signal to noise ratio; repeating the steps for a number of frequency bands, setting up a data connection and running a speed test for all optimized directions of each frequency band; automatically selecting an azimuthal operation position of the antenna based on the speed tests; and moving the antenna to the operation position.

11 Claims, 4 Drawing Sheets

(58) Field of Classification Search
USPC .......................................................... 342/367
See application file for complete search history.

(56) References Cited

U.S. PATENT DOCUMENTS

| | | |
|---|---|---|
| 2008/0132263 A1 | 6/2008 | Yu et al. |
| 2015/0155904 A1 | 6/2015 | Ingalls |
| 2018/0145808 A1 | 5/2018 | Kim et al. |
| 2018/0302751 A1* | 10/2018 | Coutinho .............. H04W 4/022 |
| 2022/0022044 A1* | 1/2022 | D'Oro ................... H04W 4/021 |

FOREIGN PATENT DOCUMENTS

| | | | |
|---|---|---|---|
| KR | 1020080047947 A | 5/2008 | |
| WO | WO-9951052 A1 * | 10/1999 | ............ H04W 36/30 |
| WO | 2017220549 A1 | 12/2017 | |

* cited by examiner

SYSTEM AND METHOD FOR OPTIMIZING BITRATE OF A WIRELESS HOTSPOT DEVICE

CROSS REFERENCE TO RELATED APPLICATION

This application is the U.S. National Stage of PCT/EP2019/079705 filed Oct. 30, 2019, which claims priority to European Patent Application No. 18203421.5, filed Oct. 30, 2018, the entire content of both are incorporated herein by reference in their entirety.

FIELD OF THE INVENTION

The present disclosure relates to a wireless hotspot device which is equipped with a directional antenna and bandwidth optimization thereof.

BACKGROUND OF THE INVENTION

The signal-to-noise ratio (SNR) for the radio connection between a hotspot and the base station influences the performance of the system. In radio communication, an omnidirectional antenna is a class of antenna which radiates radio wave power uniformly in all directions in one plane, with the radiated power decreasing with elevation angle above or below the plane, dropping to zero on the antenna's axis. Omnidirectional antennas are used in mobile devices since they typically work well even if the device is physically moved or rotated. The disadvantage of an omnidirectional antenna compared to a directional antenna (also referred to as a beam antenna) is that the gain (which coincides with the performance and the maximum attainable bitrate) is lower.

The mobile network captured by an antenna is typically distributed over land areas called cells, each served by at least one fixed-location transceiver, also known as a base station. The base station provides the cell with the network coverage which can be used for transmission of voice, data and others. When using a directional antenna the orientation of the antenna is crucial to the performance and the directional antenna is ideally directed directly towards the cell providing the signal. This is however problematic when using a mobile hotspot due to the lack of knowledge about the position of the cells in proximity of the hotspot. Mobile hotspots (sometimes referred to as portable hotspots) are devices that provide wireless access to mobile networks (or cellular networks), such as mobile phone networks. Mobile hotspots allow the user(s) to connect local devices to the mobile network via the mobile hotspot, which has a radio connection to at least one of the base stations and a local connection, such as a Wi-Fi connection, to the local device. For a mobile hotspot the positions of the available cells are unknown and the quality of their signal is as well and it is not possible to know in which direction to point the antenna to achieve the best possible connection. Hence detailed directional information on the signal is necessary to pick the ideal direction of which to face the antenna.

A previous disclosure from the same applicant is pending as WO 2017/220549 and is hereby incorporated by reference in its entirety. WO 2017/220549 relates to wireless hotspot device for communication in a mobile network comprising a directional antenna that can rotate to point in a direction of a fixed transceiver in the mobile network. The azimuthal rotation angle of the antenna is determined based on knowledge of the (GPS) position of the hotspot device and the positional data of the fixed transceivers in the mobile network. A drawback thereof is that the positional data of the fixed transceivers in the mobile network must be known in advance in order for the hotspot device to be able to rotate the directional antenna towards a transceiver. And even if the positions of the fixed transceivers are known, knowledge about which cell in the network which provides the optimal network connection is not necessarily known.

SUMMARY OF THE INVENTION

A directional antenna, in contrast to an omnidirectional antenna, provides an advantage with respect to network connection optimization. The present disclosure addresses the issue of bitrate optimization of a wireless hotspot device having at least one directional antenna. A first embodiment therefore relates to a method for optimizing the bitrate of a wireless hotspot device in a mobile network having a plurality of distributed cells, each cell covered by at least one fixed transceiver. The method comprises the step of rotating the directional antenna substantially azimuthally at least 90 degrees, preferably 360 degrees. Rotation can for example be provided in steps of N degrees, where N typically is a fixed or variable number. Such a rotation enables a scanning for available cells for each step the directional antenna is rotated. More information can be provided if N is small, but then the scanning might take too long time. N will therefore typically be between 5 and 10 degrees, but possibly smaller or larger than that.

The method may comprise a directional scanning process of several frequency bands. In a first scanning process, the signal to noise ratio may be obtained for a number of azimuthal positions for a number of available cells in one frequency band. The scanning may then be repeated for additional frequency bands. After scanning of the frequency bands, a list of available cells and their signal to noise ratios for a number of azimuthal positions are available. After the directional scanning, it may useful to select the most favourable positions for each available cell in each frequency band based on the list of available cells and their signal to noise ratios for a number of azimuthal positions of the directional antenna. In one embodiment, the azimuthal direction for each available cell corresponding to the highest signal to noise ratio for the cell is selected. In a second process, data connections may then be set up for the most favourable positions. The most favourable positions may also be referred to as the optimized azimuthal directions for the available cells. By comparing the actual data transfer connections, preferably by comparing actual bit rates of the connections, the maximum available bit rate for the wireless hotspot device in the mobile network, at a specific location, can be obtained.

Mobile hotspots (sometimes referred to as portable hotspots) are devices that provide wireless access to mobile networks (or cellular networks), such as mobile phone networks. Typically, a mobile hotspot has first wireless connection to a base station in a mobile network, wherein the first connection is a wireless modem communicating over a radio channel using a set of standards used for mobile devices and mobile telecommunications. Typically, the mobile hotspot also has local wireless connection, such as Wi-Fi, connection that local devices can connect to.

During the scanning one or more cell related parameters can be obtained. In each predefined angular position the network traffic control may provide for a handshake process and connection with one cell, the serving cell, on a fixed transceiver, thereby obtaining cell related parameters from the serving cell. The serving cell is determined by the network traffic control. But in the same angular position it is possible for the presently disclosed hotspot device to detect neighbouring cells, i.e. other cells than the serving cell on the same transceiver and possibly also cells on other transceivers. One or more of the following cell related parameters can typically be obtained: local cell ID, global cell ID, cell type (e.g. LTE), signal bandwidth, frequency, frequency band, signal power, signal quality, multiplexing format (e.g. time division multiplexing or frequency division multiplexing), network operator, country code and tracking area code. This can be coupled with the azimuth angle of the directional antenna and recorded in a database. The database can be located locally on the hotspot device, and/or the database can for example be in a central server/a cloud service, which is accessible for the hotspot device. A cell may often be visible from different neighbouring azimuthal rotational positions of the directional antenna, but this can be handled in the database.

The information obtained from the various cells in the network can now be the foundation of bitrate optimization for the hotspot device. A further step can therefore be to automatically select the cell (or cells in case of carrier aggregation) and the azimuthal position of the directional antenna from the detected available cells and azimuthal positions in the database that provides the maximum bitrate for the hotspot device. Subsequently the directional antenna can be moved to the azimuthal position corresponding to the fixed transceiver hosting the selected cell(s).

Connection of communication units in a mobile network is controlled by a central traffic control and the single unit, such as the presently disclosed hotspot device, is typically not capable of directly controlling which cell to connect to. Connection to a selected cell may accordingly not be possible at the first instance, because the network traffic control may determine that another cell than the selected cell should be the serving cell. In that case the process of automatically selecting a cell from the database of available cells, and pointing the directional antenna towards the selected cell, can then be repeated. The presently disclosed hotspot device and associated method may, according to one embodiment, make it possible to "manipulate" the network traffic control. A standard communication device in mobile network with only an omnidirectional antenna, such as a mobile phone, is typically controlled by the network traffic control. By utilizing information obtained during rotational scanning and combine it with previously obtained information from the network, publicly available information about the network and the network operator and the geographical region it is possible to actively select a serving cell in the network which is different from the serving cell which would be selected by the network traffic control. First and foremost because it is possible to point the directional antenna towards any transceiver in the network, but also by exploiting information of available frequency bands of the cells in the network and the obtainable bandwidths in each frequency band.

The present disclosure may also be seen as disclosing a method for automatically pointing a directional antenna of a wireless communication device to a fixed transceiver in a mobile network having a plurality of distributed cells, each cell covered by at least one fixed transceiver, the pointing method comprising any of the method steps as disclosed herein.

The present disclosure further relates to a method for determining the geographical position of a number of fixed transceivers in a mobile network, each fixed transceiver having a number of cells, the method comprises the steps of a) providing a communication unit having an azimuthally rotatable directional antenna, such as the presently disclosed wireless hotspot device,
b) rotating the directional antenna substantially azimuthally at least 90 degrees, preferably 360 degrees, in steps of N degrees (wherein N is a fixed or variable number),
c) scanning for available cells for each step of N degrees the directional antenna is rotated,
d) recording the following parameters in a database for each detected cell: azimuth angle of the directional antenna, geographical position of the communication unit,
e) cell ID, and optionally signal bandwidth, frequency, signal power and signal quality,
f) repeating steps b) to e) for at least one other geographical position of the communication unit, and
g) calculating the geographical positions of the detected cells based on the recorded information thereby determining the position of the corresponding fixed transceivers.

I.e. by means of a form of radio location/triangulation the positions of the fixed transceiver can be mapped helping to obtain additional information of the mobile network.

The present disclosure further relates to a directional wireless hotspot device for communication in a mobile network having a number of distributed cells, each cell covered by at least one fixed transceiver, the device comprising at least one directional antenna for 360 degrees azimuthal rotation. The presently disclosed directional wireless hotspot device may advantageously be configured for executing the presently disclosed methods.

The presently disclosed directional wireless hotspot device may advantageously comprise one or more of the following features: a printed circuit board, an electric motor for rotating the printed circuit board around an axis substantially perpendicular to the directional antenna, a compass, such as a magnetometer, a geographical positioning device, such as a GPS receiver, a wireless modem, such as a 3G/4G/LTE/5G modem, or a receiving element, such as a socket, arranged to receive an external wireless modem, a local communication element, such as a Wi-Fi circuit, for communication with a local device, a housing, at least one motor for rotating the directional antenna around an axis substantially perpendicular to the antenna boresight, at least one accelerometer for detecting sudden movements of the device, and at least one gyroscope such that the directional antenna can be kept substantially horizontal. One example of a directional wireless hotspot device that can be used is disclosed in WO 2017/220549.

DESCRIPTION OF DRAWINGS

The drawings are exemplary and are intended to illustrate some of the features of the presently disclosed method for optimizing the bitrate of a wireless hotspot device, and are not to be construed as limiting to the presently disclosed invention.

Figure 1:
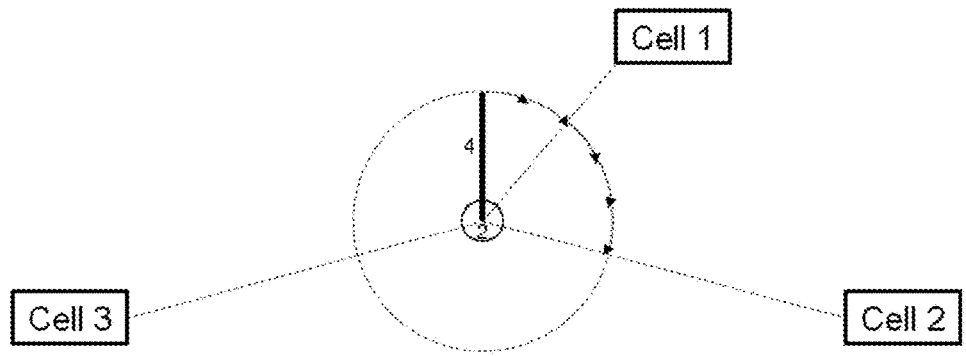
FIG. 1 shows the stepwise 360° rotation and how the directional antenna will eventually point towards each of the three cells (Cell 1, 2, 3) detectable by the hotspot device. All measured parameters, including SNR, for each of the orientations can be saved in a database.
Figure 2:
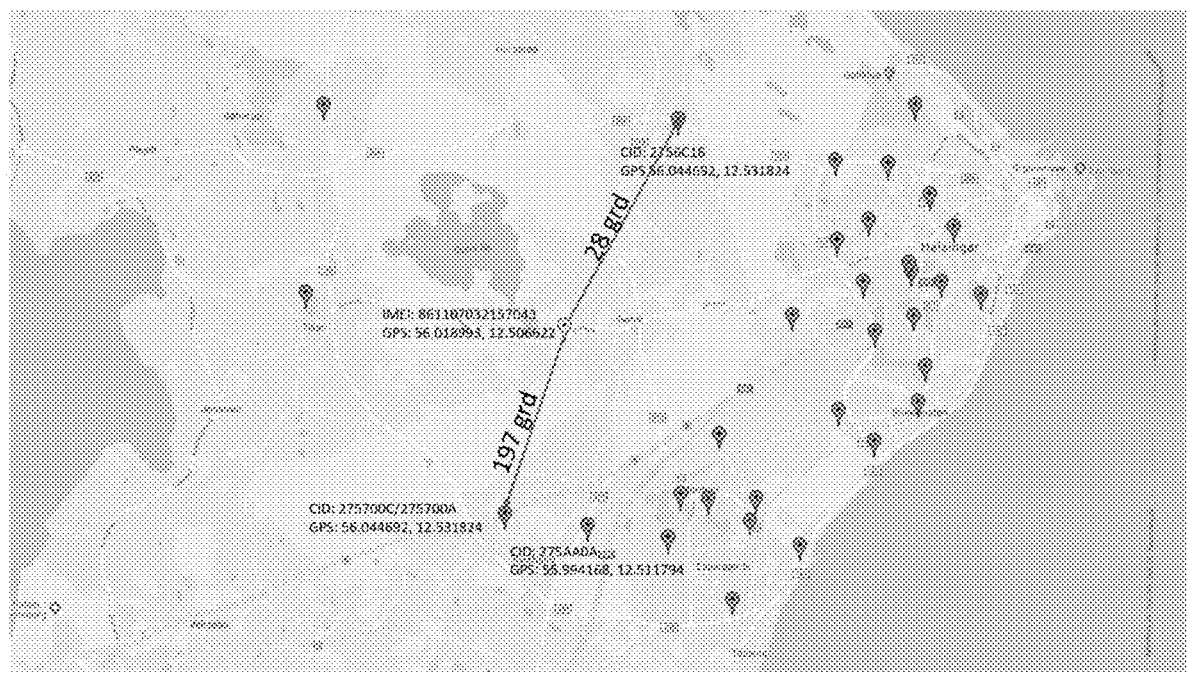
FIG. 2 shows a map of Northern Zealand in Denmark where a number of fixed transceivers are plotted in the map, each fixed transceivers comprising a number of cells. A wireless hotspot device is located in the centre of the image, most of the illustrated transceivers (and corresponding cells)

are detectable by the wireless hotspot device, but only a few of few can be connected to. The presently disclosed method of scanning the area for available cells and automatically selecting the optimal cell would be a great help for the hotspot device plotted in FIG. 2.

Figure 3:
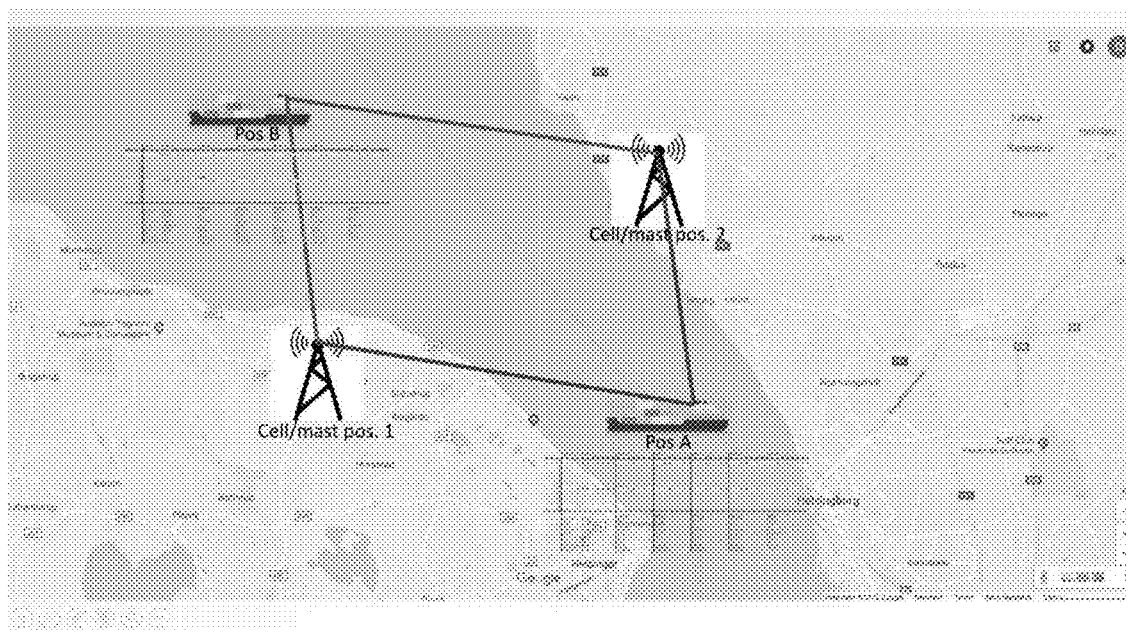

FIG. 3 shows a map of part of Northern Zealand in Denmark, part of southern Sweden and part of Oresund. A freight ship has sailed along a north-western route through Oresund and in position A ("pos A") executed a rotational scan of the network, as disclosed herein, thereby at least detecting the two illustrated transceivers "Cell/mast pos. 1" and "Cell/mast pos. 2". The rotational scan is repeated in position B ("pos B") and the same two transceivers are detected again. Based on knowledge of positions A and B and the azimuthal readings from the directional antenna, the positions of the transceivers can be calculated, e.g. based on triangulation. The most precise location of the transceiver is obtained if the angle between positions A and B relative to the transceiver is approx. 90 degrees. If data from additional rotational antenna scannings are added, the transceiver positions can be calculated in further detail. One ship can thereby map the relevant cells and transceivers, e.g. of a certain router, if several scannings are provided along the route. But it does not have to be the same ship, rotational scannings can be provided on two or more ships, e.g. in positions A and B—and also additional positions. If data are shared, e.g. to a central server, the positions of the transceivers can likewise be calculated with increasing precision as more data are added.

Figure 4:
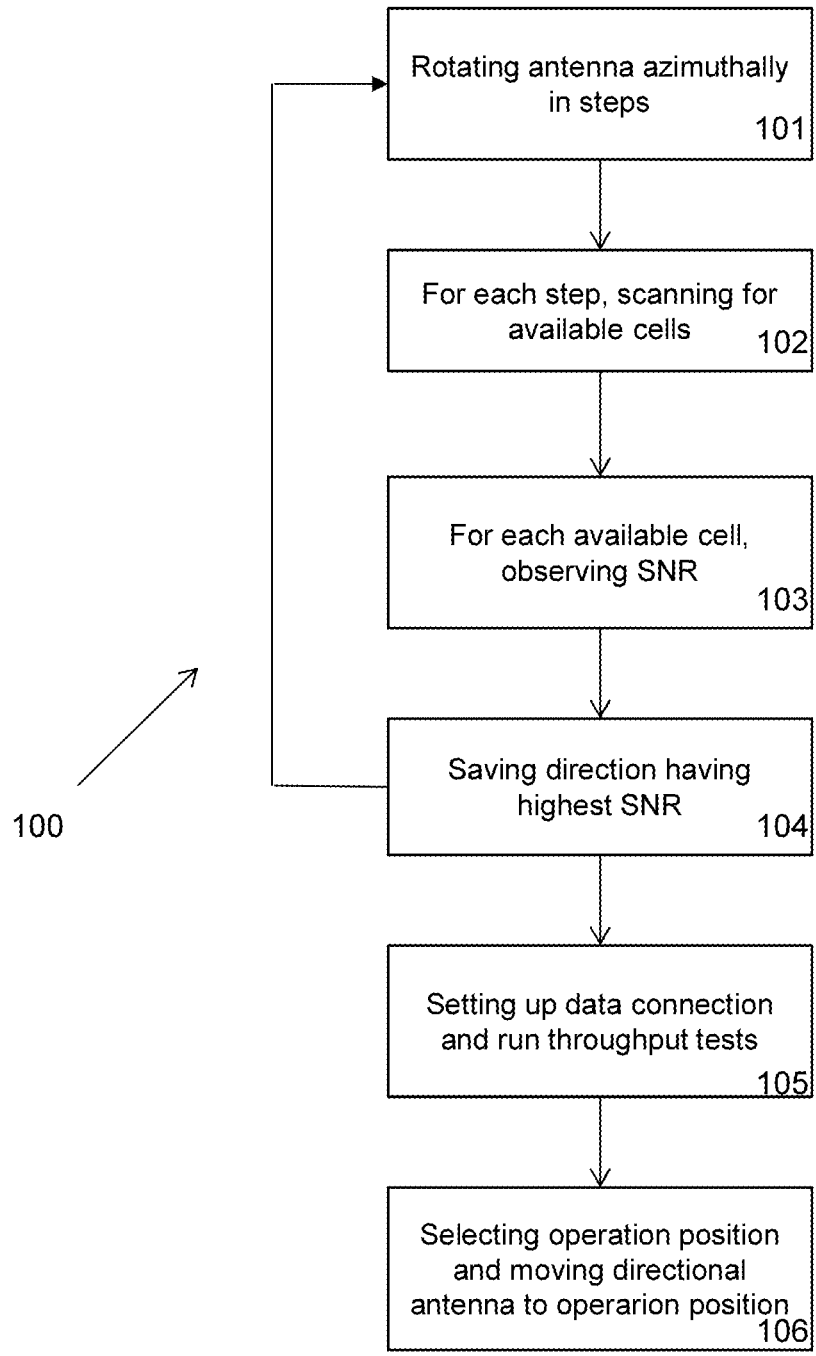

FIG. 4 shows an example of an embodiment of the presently disclosed method 100 for optimizing a bitrate of a wireless hotspot device having a directional antenna in a mobile network. The method comprises the steps of rotating the directional antenna substantially azimuthally at least 90 degrees, preferably 360 degrees, in steps of N degrees, wherein N is a fixed or variable number (101); scanning for available cells for each step of N degrees the directional antenna is rotated (102); observing a signal to noise ratio for each available cell in each step of N degrees (103); saving an optimized azimuthal direction for each available cell, wherein the optimized azimuthal direction corresponds to the highest signal to noise ratio obtained for the available cell (104); repeating the previous steps for a number of frequency bands of the mobile network (101-104), setting up a data connection and running a data transfer speed test for all optimized azimuthal directions of each frequency band (105); automatically selecting an azimuthal operation position of the directional antenna based on the data transfer speed tests; and moving the directional antenna to the azimuthal operation position (106).

Figure 5:
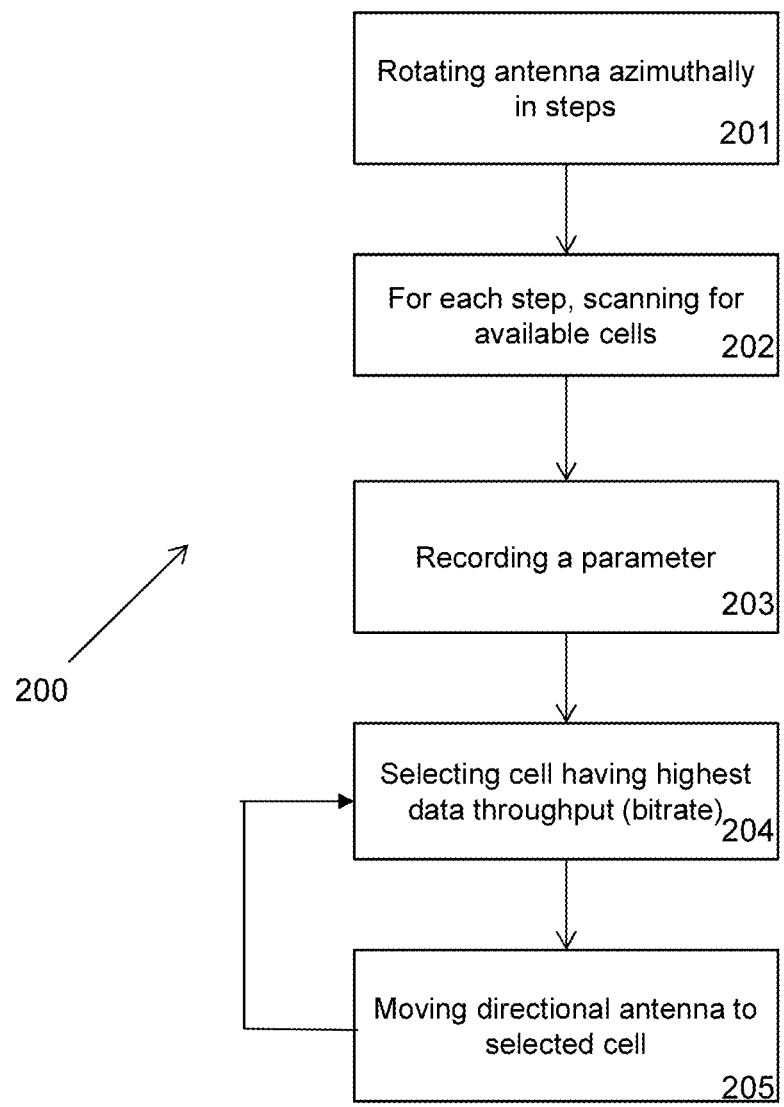

FIG. 5 shows a further example of an embodiment of the presently disclosed method for optimizing a bitrate of a wireless hotspot device having a directional antenna in a mobile network. The method comprises the steps of rotating the directional antenna substantially azimuthally at least 90 degrees, preferably 360 degrees, in steps of N degrees, wherein N is a fixed or variable number (201), scanning for available cells for each step of N degrees the directional antenna is rotated (202), recording at least one of the following parameters in a database for each detected cell: azimuth angle of the directional antenna, local cell ID, global cell ID, cell type, signal bandwidth, frequency, frequency band, signal power, signal quality, multiplexing format, network operator, country code and tracking area code (203), automatically selecting the cell and the azimuthal position of the directional antenna from the detected available cells and azimuthal positions in the database that provides a maximum bitrate of the hotspot device (204), and moving the directional antenna to the azimuthal position corresponding to the fixed transceiver hosting the selected cell (205).

DETAILED DESCRIPTION

As stated previously the present disclosure relates to a method for directing a directional antenna towards the network cell which is predicted to provide an optimal connection with respect to the bitrate in a data transfer between the mobile network and the wireless hotspot device.

According to a first embodiment of the presently disclosed method for optimizing the bitrate of a wireless hotspot device in a mobile network having a plurality of distributed cells, each cell covered by at least one fixed transceiver, the wireless hotspot device having at least one directional antenna, the following steps are carried out:
a) rotating the directional antenna substantially azimuthally at least 90 degrees, preferably 360 degrees, in steps of N degrees, wherein N is a fixed or variable number;
b) scanning for available cells for each step of N degrees the directional antenna is rotated;
c) observing a signal to noise ratio for each available cell in each step of N degrees;
d) saving an optimized azimuthal direction corresponding to a maximum signal to noise ratio for each available cell;
e) repeating steps a)-d) for a number of frequency bands,
f) setting up a data connection and running a data transfer speed test for all optimized azimuthal directions of each frequency band;
g) automatically selecting an azimuthal position of the directional antenna based on the data transfer speed tests to provide a maximum bitrate of the hotspot device; and
h) moving the directional antenna to the azimuthal position.

The first embodiment may thereby be seen as a two-step approach, wherein, in the first step, the best azimuthal positions for all available cells in all available bands are obtained, and wherein, in the second step, the available configurations obtained in the first step are further analysed using data connections and bit rate tests. The bit rate tests, which may also be referred to throughput tests, may be, for example, TCP, UDP or SCTP throughput tests and may comprise downlink and/or uplink tests.

The embodiment provides a dynamic solution, which can be seen a combination of a systematic approach with respect to frequency bands and pointing directions of the directional antenna and a pragmatic approach with respect to actual throughput performance.

The bitrate optimization may be determined by calculations based on cell information acquired from at least one scan of detectable cells on fixed transceivers in the area around the wireless hotspot device. Hence, the presently disclosed approach allows optimal directing of a directional antenna even when the positions of the near-by network cells are unknown. And even if the locations of the nearby cells are known, a scan can provide additional information of where to point the directional antenna.

Based on the calculations the optimal cell of which to connect can be selected and the antenna can then automatically be directed towards this cell. The traffic control of the network decides whether or not there is capacity for the new subscriber. If there is capacity for the subscriber and the network allows subscription connection can be established to the selected cell; if not the hotspot device is forced to connect to a different cell, most likely a serving cell determined by the traffic control. If this is not satisfactory, e.g. because the serving cell does not provide a satisfactory bandwidth, the stored information in the database can be used to direct the directional antenna towards the cell expected to have the optimal properties of the remaining available cells. In addition the hotspot device might use the rules of the network to optimize the bitrate, and by turning off/on various frequencies in the hotspot device it may be allowed to successfully connect to a desired cell.

In the case of high load of a cell resulting in a decreased network speed, which can be monitored by the presently disclosed hotspot device, it may be desirable to use a different cell than the calculated optimal cell or the current cell.

In addition the presently disclosed method may include a central collection of behaviour information of each hotspot device. This information can collected in a central database for the purpose of exchange of experience to optimize the usage. This information can be used to turn on and turn off the frequency bands to obtain the optimal data signal.

The frequency of each cell obtained during the scan can be the carrier frequency determined from the E-UTRA Absolute Radio Frequency Channel Number (EARFCN) which is an integer number between 0 and 65535 and which is independent of the channel bandwidth. EARFCN uniquely identify the LTE band and carrier frequency. A frequency band is an interval in the frequency domain. In standards for wireless broadband communication, such as LTE, the available frequencies are divided into bands. As an example, in LTE Band 1 is allocated for FDD, has an uplink band 1920-1980 MHz and a downlink band 2110-2170 MHz, and may use channel bandwidths of 5, 10, 15 or 20 MHz. Similar employment of frequency bands exist for 5G and 3G standards.

The signal power of each cell can be the Reference Signals Received Power (RSRP. The signal quality can be the Reference Signal Received Quality (RSRQ), i.e. a signal-to-noise ratio (SNR).

A public land mobile network (PLMN), as defined in telecommunications regulation, is a network that is established and operated by an administration or by a recognized operating agency (ROA) for the specific purpose of providing land mobile telecommunications services to the public. A PLMN is identified by the Mobile Country Code (MCC) and the Mobile Network Code (MNC). Tracking Area is a logical concept of an area where a user can move around without updating the Mobility Management Entity (MME), which is the key control-node for an LTE access-network.

Each cell broadcasts a special tracking area code (TAC) to indicate to which Tracking Area the cell belong to and the TAC is unique within a PLMN.

The global cell ID is a unique number for identifying the cell. Another identification number is the local cell ID, typically identifying the cell within the corresponding transceiver, the local ID can be used to obtain the global cell ID for this cell, e.g. in combination with the external look-up table. Cell type is the type of cell, e.g. 3G, 4G (LTE) or 5G.

When automatically selecting a cell from the information obtained during a scan of the directional antenna, there are typically threshold levels for the signal power and/or the signal quality. If the signal power is too low, a good quality network connection cannot be established. Likewise with the signal quality—a minimum SNR is typically needed. Hence, a first step in the selection process can be to apply a threshold level to the signal power and/or the signal quality and/or to sort the cells according to signal power and/or signal quality. This can be threshold levels that are determined internally for the hotpot device, but it is also relevant to know the threshold levels used the network traffic control, i.e. at what threshold levels of signal quality and/or signal power does the traffic control start looking for alternative cells.

In a handshake process with a serving cell during rotational scan, a signal bandwidth of the specific cell will be obtained. But the handshake process and the detected information from neighbouring cells do typically not include the available signal bandwidths of each cell—but the available bandwidths can be very important for the maximum achievable bite rate. The amount of information received by the hotspot device from a serving cell during a handshake process is typically much more detailed than the information that can be received by the hotspot device from the neighbouring cells. But this type of information is typically publicly available based on the cell ID and typically also the network operator, e.g. what frequency bands and/or what signal bandwidths in each frequency band are available to the specific network operator in the specific geographic region. Hence, the database recorded during a scan can be updated with external information of this type of information for each detected cell.

Alternatively the automatic selection process can include a lookup in an external or internal database comprising such information of each cell.

For smart phones with omnidirectional antennas it is normally a central (network) traffic control which determines which cell each phone connects to and which carrier frequency is used. Often a smart phone is connected to a cell initially using a low carrier frequency, such as 800 MHz, but is switched to a higher carrier frequency, such as 2100 MHz, if the bitrate requirement increases or the traffic control need the capacity for other subscribers. A central traffic control will also typically be the determining factor with the presently disclosed wireless hotspot device. However, it may be advantageous to be able to control the wireless hotspot device such that only the desired carrier frequency is active, e.g. controlling the available/active frequency bands of the wireless hotspot device, to match the frequency band of the selected cell, e.g. controlling the hotspot device such that only the 2100 MHz frequency band is active such that the connection to the desired cell is forced to employ the 2100 MHz carrier frequency, thereby increasing the available bitrate in the connection.

Another way to maximize the bitrate is to employ carrier aggregation, where two or more component carriers on the same cell, or on different cells, are aggregated to increase the bandwidth and thereby the obtainable bitrate. Both intra-band and extra-band carrier aggregation are possible. However, information about the opportunities for carrier aggregation is not necessarily received in a cell identification process during the presently disclosed rotational scanning—and it will typically not be the presently disclosed device which can determine or request carrier aggregation, this will typically be determined by the network traffic control. But this type of information is typically publicly available based on the cell ID. Or this type of information may be available based on previous experience with communication in the network. Hence, the database recorded during a scan can be updated with external information of the possibilities for carrier aggregation of the specific cell or several cells on the same transceiver.

Alternatively the automatic selection process can include a lookup in an external or internal database comprising additional information of each cell. I.e. even though that carrier aggregation cannot normally be directly requested in a traffic control regime, the presently disclosed hotspot device and associated method makes it possible to assist the traffic control in making it easy to allow for carrier aggregation by pointing the directional antenna toward a transceiver where it is known that one or more cells allow for carrier aggregation, and/or disable one or more frequency bands of the hotspot device such that connection is provided to a specific/preselected serving cell in a frequency band that allows for carrier aggregation, thereby most likely optimizing the maximum achievable bitrate of the connection.

Hence, the presently disclosed method may further comprise the step of retrieving the properties of each cell based on the cell ID, said properties comprising information of capacity, bandwidth, carrier aggregation.

The presently disclosed wireless hotspot device may further comprise at least one omnidirectional antenna. Thereby adjacent cells in the network can be detected without providing a scanning with the directional antenna. Traffic control may then tell which specific cell the hotspot device must connect to and the hotspot device connects by means of the omnidirectional antenna, the specific cell ID now being known. If a rotational scanning has previously been provided, or if the positions of the relevant transceiver are known, the hotspot device knows in which direction the specific cell is located and can point the directional antenna towards the specific cell. The communication link can then be provided by means of the directional antenna, which typically can provide for a much better connection to the cell.

The presently disclosed directional wireless hotspot device may be operational in any mobile network, using any communication standard or protocol, including GSM, UMTS, LTE, HSDPA, HSUPA, HSPA+, TD-SCDMA, CDMA and WiMAX based networks, or mobile telecommunication technology of any generation, including 3G, 4G and 5G. The device may be configured to operate in a range of frequencies, such as in the range of 500 MHz to 60 GHz, or in the range of 700 MHz to 30 GHz, or in the range of 700-2600 MHz, or specifically in the range of 1600-2800 MHz or in the range of 1800-2600 MHz. The device may further be configured to operate in a Wi-Fi network. Different versions of Wi-Fi exist, with different ranges, radio bands and speeds. Wi-Fi typically uses the 2.4 gigahertz and 5.8 gigahertz radio bands. These bands can be subdivided into multiple channels and each channel can be time-shared by multiple networks.

The presently disclosed directional wireless hotspot device may have a local wireless communication element, such as a Wi-Fi circuit, for communication with a local device. The directional wireless hotspot device may have connectors for connecting the local wireless communication element to an external antenna, such as a Wi-Fi antenna, for improved local wireless communication.

In one embodiment of the presently disclosed directional wireless hotspot, the local communication element is a wireless communication element. The local wireless communication element may be a Wi-Fi circuit configured to communicate with a local user device, such as a mobile phone, tablet, PC or any device.

A method for automatically pointing a directional antenna of a wireless communication device to a fixed transceiver in a mobile network having a plurality of distributed cells, each cell covered by at least one fixed transceiver, the method comprising the steps of rotating the directional antenna substantially azimuthally at least 90 degrees, preferably 360 degrees, in steps of N degrees (wherein N is a fixed or variable number), scanning for available cells for each step of N degrees the directional antenna is rotated, recording the following parameters in a database for each detected cell: azimuth angle of the directional antenna, cell ID, bandwidth, Evolved-UTRA Absolute Radio Frequency No (EARFCN), Reference Signals Received Power (RSRP) and Reference Signal Received Quality (RSRQ), automatically selecting a preferred cell from the detected available cells in the database using a signal quality parameter, moving the directional antenna to the azimuthal position corresponding to the fixed transceiver hosting the preferred cell.

EXAMPLE

An example of the presently disclosed method for optimizing the bitrate of a wireless hotspot device in a mobile network is provided. The tables are exemplary and do not disclose a complete scanning. In table 1 a number of frequency bands are scanned. First Band 1 is scanned. As can be seen, the table does not show a 360° scan. One cell (cell ID 405) is connected to and the maximum SNR is found in direction 263° with respect to a reference direction. Thus, the specific setup (direction, band, cell) is saved. Similar scans are conducted for Band 3 and Band 7. In Band 7 several cells (cell ID 21, 78 and 80) are connected to. In the column SNR', the highest value for each cell is noted (M) and the setup is saved. If there are several positions having the same SNR, a secondary parameter, such as the rsrp, can be used to select the preferred azimuthal direction.

In table 2, the saved configurations from the first step, i.e. the scanning of table 1, are tested in terms of obtainable bit rates, i.e. by establishing a data connection and executing throughput tests. Such tests may comprise downlink and/or uplink tests. In table it can be seen that the specific configuration of Band 7, cell having Cell ID 21 and pointing the directional antenna in azimuthal direction 150° provides the most favourable configuration for the wireless hotspot device.

TABLE 1

| Az. dir | SNR | Cell ID | Band | rsrp |
|---------|------|---------|------|--------|
| 303 | 13 | 305 | 1 | −103 |
| 283 | 14 | 305 | 1 | −100 |
| 263 | M 16 | 305 | 1 | S −96 |
| 244 | 15 | 305 | 1 | −91 |
| ... | | | | |
| 281 | 11 | 457 | 3 | −82 |
| 262 | 16 | 457 | 3 | −83 |
| 242 | M 17 | 457 | 3 | S −77 |
| 221 | 15 | 457 | 3 | −72 |
| 199 | 13 | 457 | 3 | −66 |
| ... | | | | |
| 217 | 9 | 18 | 7 | −115 |
| 197 | M 13 | 50 | 7 | S −108 |
| 171 | 10 | 18 | 7 | −105 |
| 150 | M 12 | 18 | 7 | S −109 |
| 125 | M 12 | 33 | 7 | S −114 |
| 103 | 11 | 33 | 7 | −120 |
| 41 | 9 | 33 | 7 | −120 |
| 20 | 10 | 33 | 7 | −126 |
| ... | | | | |

TABLE 2

| Az. dir. | Band | SNR | rsrp | MB/s | Cell ID | Freq |
|---|---|---|---|---|---|---|
| 263 | 1 | 16 | −96 | 57 | 305 | 500 |
| 150 | 7 | 12 | −109 | 65 | 18 | 3348 |
| 242 | 3 | 17 | −77 | 20 | 457 | 1850 |
| 197 | 7 | 13 | −108 | 10 | 50 | 3348 |
| 125 | 7 | 12 | −114 | 35 | 33 | 3348 |

REFERENCE

International application PCT/EP2017/065043 (International publication number WO 2017/220549), "DIRECTIONAL WIRELESS HOTSPOT DEVICE AND METHOD FOR POINTING A DIRECTIONAL ANTENNA", is hereby incorporated by reference in its entirety.

The invention claimed is:

1. A method for optimizing a bitrate of a wireless hotspot device in a mobile network having a plurality of distributed cells, each cell covered by at least one fixed transceiver, the wireless hotspot device having at least one directional antenna, the method comprising the steps of:
   a) rotating the directional antenna substantially azimuthally at least 90 degrees, in steps of N degrees, wherein N is a fixed or variable number;
   b) scanning for available cells for each step of N degrees the directional antenna is rotated;
   c) observing a signal to noise ratio for each available cell in each step of N degrees;
   d) saving an optimized azimuthal direction for each available cell, wherein the optimized azimuthal direction corresponds to the highest signal to noise ratio obtained for the available cell;
   e) repeating steps a)-d) for a number of frequency bands of the mobile network,
   f) setting up a data connection and running a data transfer speed test for all optimized azimuthal directions of each frequency band;
   g) automatically selecting an azimuthal operation position of the directional antenna based on the data transfer speed tests; and
   h) moving the directional antenna to the azimuthal operation position,
   wherein the directional antenna is rotated in steps of 1-20 degrees, or in steps of 5-15 degrees, or 5 degrees or 10 degrees.

2. The method according to claim 1, wherein the azimuthal operation position is selected based on a downlink throughput test, an uplink throughput test, or a combination.

3. The method according to claim 2, wherein the downlink throughput test and/or uplink throughput test comprises multiple input and multiple output (MIMO).

4. The method according to claim 1, wherein the step of saving an optimized azimuthal direction for each available cell comprises the step of comparing a secondary parameter related to the signal strength and/or signal quality, such as Reference Signals Received Power (RSRP) and/or signal quality is Reference Signal Received Quality (RSRQ) and/or Received Signal Strength Indicator (RSSI).

5. The method according to claim 1, wherein the mobile network is a 3G, 4G or 5G network.

6. The method according to claim 1, wherein a handshake process is provided with a serving cell at each azimuth angle of the scanning and wherein neighbouring cells are detected and cell parameters recorded for each detected cell.

7. The method according to claim 1, further comprising the step of controlling the available/active frequency bands of the wireless hotspot device, to match one of the available frequency bands of the selected cell.

8. The method according to claim 1, wherein the step of rotating the directional antenna substantially azimuthally at least 90 degrees, comprises rotating the directional antenna substantially azimuthally 360 degrees.

9. A directional wireless hotspot device for communication in a mobile network having a number of distributed cells, each cell covered by at least one fixed transceiver, the device comprising at least one directional antenna for 360 degrees azimuthal rotation, the device comprising a processing unit configured to
   a) rotate the directional antenna substantially azimuthally at least 90 degrees, in steps of N degrees, wherein N is a fixed or variable number;
   b) scan for available cells for each step of N degrees the directional antenna is rotated;
   c) observe a signal to noise ratio for each available cell in each step of N degrees;
   d) save an optimized azimuthal direction for each available cell, wherein the optimized azimuthal direction corresponds to the highest signal to noise ratio obtained for the available cell;
   e) repeat steps a)-d) for a number of frequency bands of the mobile network,
   f) set up a data connection and running a data transfer speed test for all optimized azimuthal directions of each frequency band;
   g) automatically select an azimuthal operation position of the directional antenna based on the data transfer speed tests; and
   h) move the directional antenna to the azimuthal operation position,
   the device further comprising:
   a wireless modem or a receiving element arranged to receive an external wireless modem;
   a directional antenna for communication with a base station;
   a local communication element for communication with a local device; and
   an electric motor for rotating the directional antenna around an axis substantially perpendicular to said directional antenna.

10. The directional wireless hotspot device according to claim 9, wherein the wireless modem is a 3G/4G/LTE/5G modem, the receiving element is a socket, and the local communication element is a Wi-Fi circuit.

11. The directional wireless hotspot device according to claim 9, further comprising at least one of the following features:
   a printed circuit board,
   a compass or a magnetometer,
   at least one accelerometer,
   at least one gyroscope,
   a geographical positioning device or a GPS receiver,
   a housing,
   at least one motor for rotating the directional antenna around an axis substantially perpendicular to an antenna boresight.

* * * * *